United States Patent
Kikkeri et al.

(10) Patent No.: US 9,321,173 B2
(45) Date of Patent: Apr. 26, 2016

(54) TRACKING AND FOLLOWING PEOPLE WITH A MOBILE ROBOTIC DEVICE

(75) Inventors: Harshavardhana Narayana Kikkeri, Bellevue, WA (US); Michael F. Koenig, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 491 days.

(21) Appl. No.: 13/531,401

(22) Filed: Jun. 22, 2012

(65) Prior Publication Data

US 2013/0342652 A1 Dec. 26, 2013

(51) Int. Cl.
  G06F 3/01 (2006.01)
  G06D 1/02 (2006.01)
  B25J 9/10 (2006.01)
  G05D 1/02 (2006.01)
  G06T 7/20 (2006.01)

(52) U.S. Cl.
  CPC .............. B25J 9/104 (2013.01); G05D 1/0242 (2013.01); G05D 1/0246 (2013.01); G06T 7/20 (2013.01); G06T 2207/10016 (2013.01); G06T 2207/10024 (2013.01); G06T 2207/30201 (2013.01)

(58) Field of Classification Search
  None
  See application file for complete search history.

(56) References Cited

U.S. PATENT DOCUMENTS

| | | | |
|---|---|---|---|
| 6,917,855 B2 | 7/2005 | Gonzalez-Banos et al. | |
| 7,330,567 B2 | 2/2008 | Hong et al. | |
| 7,684,894 B2 | 3/2010 | Sakai et al. | |
| 7,957,837 B2* | 6/2011 | Ziegler et al. | 700/258 |
| 8,036,775 B2* | 10/2011 | Matsumoto et al. | 700/253 |
| 8,045,418 B2* | 10/2011 | Suzuki | 367/124 |
| 8,195,333 B2* | 6/2012 | Ziegler et al. | 700/259 |
| 2007/0027579 A1* | 2/2007 | Suzuki et al. | 700/245 |
| 2007/0150106 A1* | 6/2007 | Hashimoto et al. | 700/245 |
| 2008/0215184 A1 | 9/2008 | Choi | |
| 2010/0228421 A1* | 9/2010 | DiBernardo et al. | 701/28 |
| 2011/0071675 A1 | 3/2011 | Wells | |
| 2011/0288684 A1* | 11/2011 | Farlow et al. | 700/264 |
| 2012/0022785 A1* | 1/2012 | DiBernardo et al. | 701/514 |

OTHER PUBLICATIONS

Chang, C.-W., K.-T. Chen, H.-L. Lin, C.-K. Wang, J.-H. Jean, Development of a patrol robot for home security with network assisted interactions, SICE, 2007 Annual Conf., Sep. 17-20, 2007, pp. 924-928.

(Continued)

*Primary Examiner* — Jay Patel
*Assistant Examiner* — Reza Aghevli
(74) *Attorney, Agent, or Firm* — Sandy Swain; Micky Minhas

(57) ABSTRACT

Tracking and following technique embodiments are presented that are generally employed to track and follow a person using a mobile robotic device having a color video camera and a depth video camera. A computer associated with the mobile robotic device is used to perform various actions. Namely, in a tracking mode, a face detection method and the output from the color video camera is used to detect potential persons in an environment. In addition, a motion detection method and the output from the depth video camera is also used to detect potential persons in the environment. Detection results obtained using the face and motion detection methods are then fused and used to determine the location of one or more persons in the environment. Then, in a following mode, a mobile robotic device following method is used to follow a person whose location was determined in the tracking mode.

19 Claims, 10 Drawing Sheets

(56) References Cited

OTHER PUBLICATIONS

Chen, C.-H., C. Cheng, D. L. Page, A. Koschan, M. A. Abidi, A moving object tracked by a mobile robot with real-time obstacles avoidance capacity, 18th Int'l Conf. on Pattern Recognition, ICPR 2006, Aug. 20-24, 2006, pp. 1091-1094, Hong Kong, China.

Schulz, D., W. Burgard, D. Fox, A. B. Cremers, Tracking multiple moving objects with a mobile robot, 2001 IEEE Computer Society Conference on Computer Vision and Pattern Recognition, CVPR 2001, Dec. 8-14, 2001, pp. 371-377, Kauai, HI, USA.

Zheng, Y, Y. Meng, Real-time people tracking and following using a visual controlled mobile robot, Robot Vision: New Research, Oct. 2009, pp. 149-160, Chapter 5, Taisho Matsuda (Ed.), Nova Science Publishers, Inc.

* cited by examiner

TRACKING AND FOLLOWING PEOPLE WITH A MOBILE ROBOTIC DEVICE

BACKGROUND

Tracking and following people moving about an environment with a mobile robotic device is an extremely useful task and can be advantageously employed in service robot systems, as well as in so-called party-bot and entertainment-bot systems. In the case of service robots, the mobile robotic device can follow a person moving about his or her home. For example if the person is cleaning or performing home repairs, the robotic device could follow the person while carrying cleaning supplies or tools. Similarly, if the person is incapacitated in some way or elderly, the robotic device could follow that person while carrying medical equipment, medicines, or a communication device—so that these items are readily available no matter where the person is located. Such a service robot could also be helpful in public places, schools and office buildings. In the case of a party-bot, the mobile robotic device could be tasked to follow a person around with a serving tray holding snacks and drinks; or be tasked with capturing video of the person as he or she mingles with guests. In the case of an entertainment-bot, the mobile robotic device could be tasked to follow a person around a venue while playing music or playing a video on a display carried by the robotic device.

SUMMARY

Tracking and following technique embodiments described herein generally facilitate the autonomous tracking of people by a mobile robotic device and the following of a tracked person as that person moves through an environment. In one general exemplary embodiment, this is accomplished using a computer associated with the mobile robotic device, which in a tracking mode uses a face detection method and the output from a color video camera to detect potential persons in the environment. In addition, a motion detection method and the output from a depth video camera is used to also detect potential persons in the environment. The detection results obtained using the face and motion detection methods are fused and employed to determine the location of one or more persons in the environment. Then, in a following mode, the computer employs a following method to cause the mobile robotic device to follow a person whose location was determined in the tracking mode.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of tracking and following technique embodiments for tracking and following people using a mobile robotic device reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that specific terminology will be resorted to in describing the present invention for the sake of clarity and it is not intended for the present invention to be limited to the specific terms so chosen. Furthermore, it is to be understood that each specific term comprises all its technical equivalents that operate in a broadly similar manner to achieve a similar purpose. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order nor imply any limitations of the invention.

1.0 Tracking and Following People Using a Mobile Robotic Device

The tracking and following technique embodiments described herein facilitate the autonomous tracking of people within an environment using a mobile robotic device and the following of a person with or without their face/head being visible. Tracking and following involves a balance between tracking people and moving the robotic device so that the tracked person is always in view.

Figure 1:
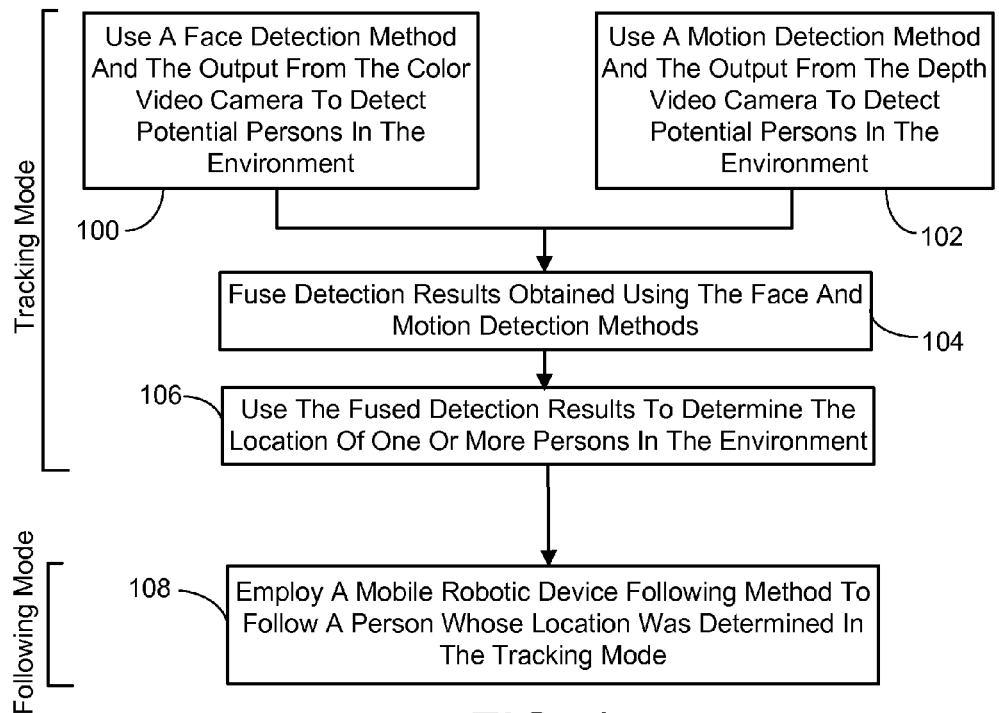
FIG. 1 is a flow diagram generally outlining one embodiment of a process for tracking and following a person using a mobile robotic device having a color video camera and a depth video camera.

In one general tracking and following technique embodiment outlined in FIG. 1, a computer-implemented process is employed to track and follow a person using a mobile robotic device having a color video camera and a depth video camera. This process uses a computer associated with the mobile robotic device to perform various actions. Namely, in a tracking mode, a face detection method and the output from the color video camera is used to detect potential persons in an environment (process action 100). In addition, a motion detection method and the output from the depth video camera is used to detect potential persons in the environment (process action 102). Detection results obtained using the face and motion detection methods are then fused (process action 104) and used to determine the location of one or more persons in the environment (process action 106). Then, in a following mode, a mobile robotic device following method is used to follow a person whose location was determined in the tracking mode (process action 108).

It is noted that transitioning from the tracking mode to the following mode can be handled in a number of ways. For example, in one embodiment, the mobile robotic device can automatically select a person to follow either randomly or based on a prescribed set of criteria. In another embodiment, the following mode is initiated in response to a request from one of the persons detected in the environment to follow that person.

The tracking and following modes will be discussed in more detail in sections to follow. However, first the mobile robotic device will be considered.

1.1 Mobile Robotic Device

Before the aforementioned tracking and following technique embodiments are described in more detail, a general description of a suitable mobile robotic device in which portions of the technique may be implemented will be described.

Figure 2:
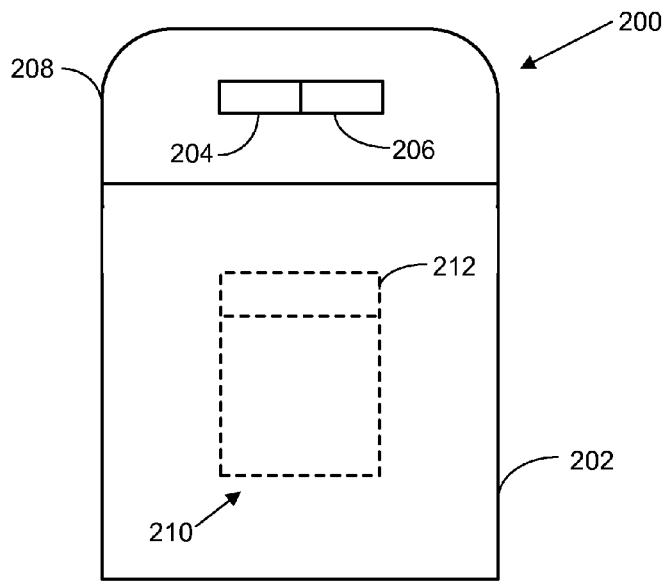
FIG. 2 is a simplified component diagram of a suitable mobile robotic device in which the tracking and following process of FIG. 1 can be implemented.

A suitable mobile robotic device can in general be any conventional mobile robotic device that exhibits the following attributes. First, referring to FIG. 2, the robotic device 200 is able to move about the environment in which it is intended to travel. Thus, the mobile robotic device 200 includes a locomotive section 202 for moving the device through the environment. The mobile robotic device 200 also has sensors that are employed to track and follow people through the applicable environment. In particular, these sensors include a color video camera 204 and depth video camera 206. The color video camera 204 outputs a continuous sequence of digital color images of the scene captured by the camera. These images are sometimes referred to herein as image frames. For example, a conventional RGB video camera can be employed. The depth video camera 206 outputs a continuous sequence of digital depth images of the scene captured by the camera. These images are sometimes referred to herein as depth frames. The pixel values in a depth frame are indicative of the distance between the depth camera and an object in the environment. For example, a conventional infrared-based depth camera can be employed where the camera projects a known infrared pattern onto the environment and determines depth based on the pattern's deformation as captured by an infrared imager. The color and depth video cameras 204, 206 are repositionable so that different portions of the environment (sometimes referred herein as a scene) can be captured. To this end, the color and depth video cameras 204, 206 can be housed in a head section 208 of the mobile robotic device 200 that typically is disposed above the aforementioned locomotive section 202. The point of view of the cameras 204, 206 can be changed by redirecting the cameras themselves, or by moving the head section 208, or both. An example of the latter scenario is a configuration where the head section rotates about a vertical axis to provide a 360 degree panning motion, while the cameras pivot up and down to provide a tilting motion. The cameras can also have a zoom feature.

Additionally, the cameras are synchronized in that each camera captures an image of the scene at the same time. Thus, a contemporaneous pair of color and depth frames is produced each time the scene is captured. As will be explained shortly, the tracking and following technique embodiments described herein use pixel correlations between each contemporaneously captured pair of color and depth frames in order to accomplish the task of tracking and following people. In other words, knowing which pixel in one of the frames of the pair depicts the same location in the scene as a given pixel in the other frame is employed in tracking and following people. While conventional methods can be employed to ascertain this pixel correlation each time a pair of contemporaneous frames is captured, in one embodiment a pre-computed transform that defines the pixel coordination is employed. More particularly, if the color and depth video cameras are synchronized such that they are moved together in the same manner, the relative transformation between them will not change. As such, the transformation can be pre-computed and used to determine the pixel correlation for each pair of contemporaneous frames captured.

The mobile robotic device 200 also includes a control unit 210 that controls the locomotive section 202 to move the robotic device through the environment in a conventional manner; and controls the movement of the head section 208, or the cameras 204, 206, or both, to capture different scenes within the environment. In addition, the control unit 210 includes a computing device 212 (such as those described in the Exemplary Operating Environments section of this disclosure). This computing device 212 includes a control module that is responsible for initiating movement control signals to the locomotive and head sections, and for using the frames captured by the color and depth video cameras to track and follow people within the environment. The control of the movement of the locomotive and head sections is done using conventional methods. Whereas, the latter two functions are handled by a tracking mode sub-module and a following mode sub-module, respectively, as will be described in more detail shortly.

The mobile robotic device 200 can also have an obstacle avoidance system for detecting and avoiding obstacles lying in the path of travel of the mobile robotic device. The obstacle avoidance system employs one or more sensors (such as the aforementioned cameras, or in one embodiment infrared and ultrasonic range finders) and an obstacle avoidance sub-module of the aforementioned control module that uses the sensor outputs to detect obstacles in the current travel path of the robot and to compute an alternate path which avoids the obstacle. The control unit then controls the movement of the robotic device so as to follow the alternate route around the obstacle.

1.2 Tracking Mode

As described previously, the tracking mode generally involves using a face detection method and the output from the color video camera to detect potential persons in an environment, as well as using a motion detection method and the output from the depth video camera to detect potential persons in the environment. The detection results obtained using the face and motion detection methods are fused and used to determine the location of one or more persons in the environment. The detected people are then tracked within the environment. This can involve moving the mobile robotic device if necessary to keep track of a detected person.

In general, the tracking and following technique embodiments described herein employ conventional face detection and motion detection methods, and the fusing can be as simple as finding all the persons in the environment detected by either method. However, it is noted that the same person can be detected by both detection methods. To deal with this, in one embodiment, for each potential person detected using the face detection method, fusing the detection results obtained using the face and motion detection methods includes ascertaining if the location of the potential person detected using the face detection method corresponds to the location of a potential person detected using the motion detection method. If so, that location is deemed to be the location of just one person in the environment.

In one embodiment, tracking the people detected in the environment over time involves periodically repeating the foregoing face and motion detection actions, as well as fusing the results and using them to determine the current location of people in the environment. In addition, in one embodiment, an attempt is made to ascertain the identity of one or more of the detected people. This identification action would be accomplished using conventional methods, including having the mobile robotic device interact with a person and request identifying information.

1.3 Following Mode

As described previously, the following mode generally involves employing a mobile robotic device following method to follow a person whose location was determined in the tracking mode. In the context of the exemplary mobile robotic device described previously, this person following generally involves using the locomotive section to move the robotic device so as to stay in the vicinity of the person being followed. In addition, the robotic device's head section is rotated and the cameras pivoted to track the person as they move through the environment.

While it might be possible to keep track of a person being followed using the previously-described tracking mode, problems can arise. First, when following a person, that person will often be facing away from the mobile robotic device. Since the person's face is turned away from the robotic device, the person will have to be tracked using something other than a face recognition process (such as used in the previously-described tracking mode). Additionally, in cases where the mobile robotic device uses the aforementioned color and depth video cameras as the sensors in its obstacle avoidance system, the cameras will typically be directed along the robotic device's path. This allows the robotic device to detect and avoid obstacles while following a person through the environment. As a result, the cameras will often not be able to "see" the persons face or head. In view of this, the challenge is to keep track of a person when the robotic device cannot see his or her face or head. As will be described in greater detail later, the tracking and following technique embodiments described herein generally handle the aforementioned challenge using a torso blob-based tracking scheme. This scheme uses the depth frames from the depth video camera to track the person's torso pattern.

In one exemplary scenario, the mobile robotic device will first track a detected person using the aforementioned tracking mode. When the following mode is initiated to follow that person, the video cameras are repositioned (e.g., lowered) while tracking the person's "blob" down from face to torso. Once the camera is low enough to do good obstacle avoidance, the robotic device starts to follow the person while tracking their torso. This torso is essentially a blob which has a bounding box around it which indicates the region in which it can be present in the next frame.

Figure 3:
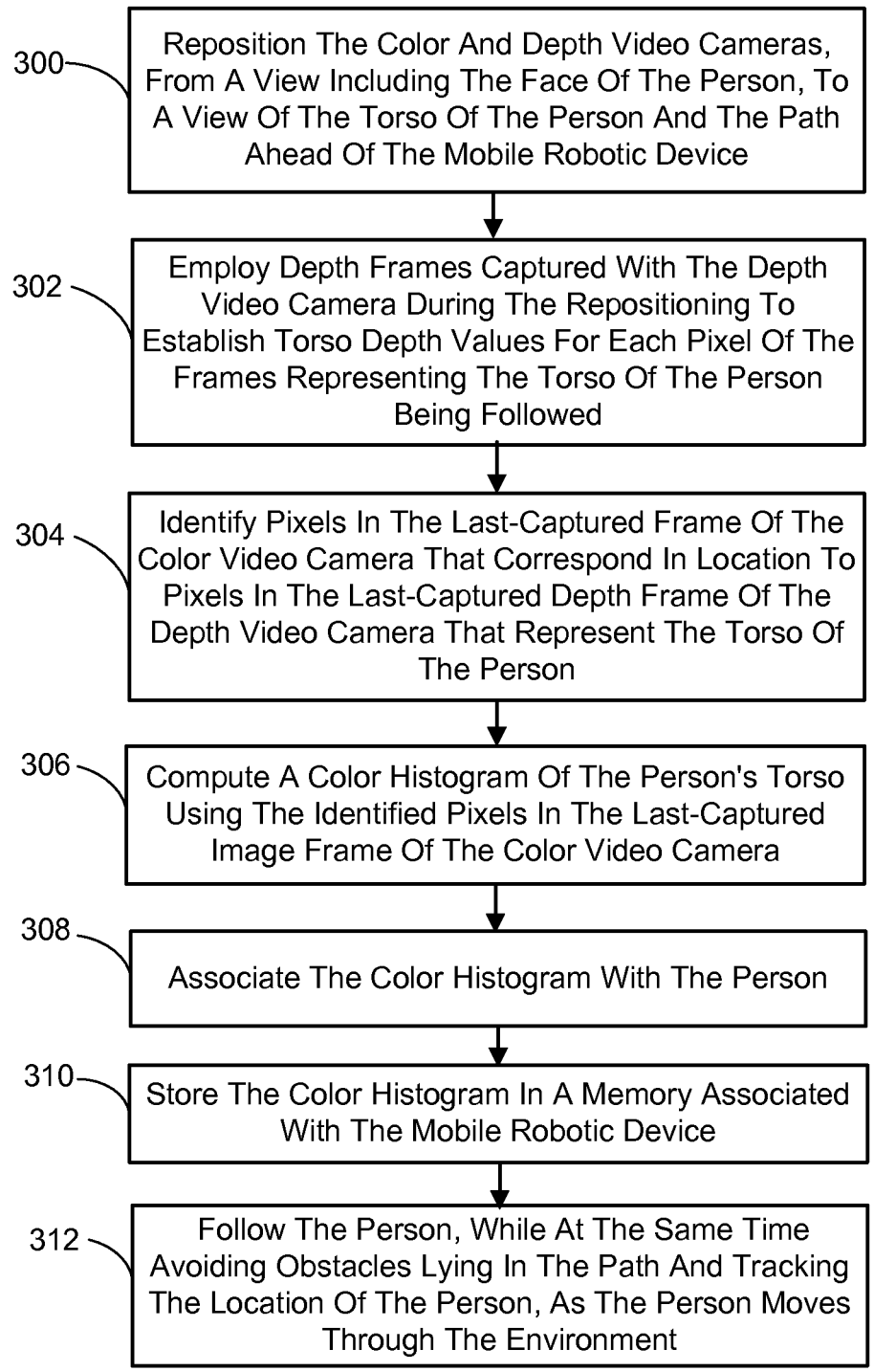
FIG. 3 is a flow diagram generally outlining an implementation of the part of the process of FIG. 1 involving the following mode.

More particularly, referring to FIG. 3, the following mode begins with a repositioning the color and depth video cameras, from a view including the face of the person, to a view of the torso of the person and the path ahead of the mobile robotic device such that obstacles lying in the path of the mobile robotic device encountered while following the person are in the view of the color and depth video cameras (process action 300). Depth frames captured with the depth video camera are employed during the repositioning to establish torso depth values for each pixel of the frames representing the torso of the person being followed (process action 302). Once the repositioning of the color and depth video cameras is complete, pixels are identified in the last-captured frame of the color video camera that correspond in location to pixels in the last-captured depth frame of the depth video camera that represent the torso of the person (process action 304). A first color histogram of the person's torso is then computed using the identified pixels in the last-captured image frame of the color video camera (process action 306). The color histogram is associated with the person (process action 308), and stored in a memory associated with the mobile robotic device (process action 310). Whenever the person changes location, the mobile robotic device follows the person, while at the same time avoiding obstacles lying in the path and tracking the location of the person as the person moves through the environment (process action 312). It is noted that in one embodiment, the path taken to follow the person is chosen so as to maintain the ability to track the location of the person despite obstacles that have the potential to block a line of sight between the mobile robotic device and the person.

Figure 4A:
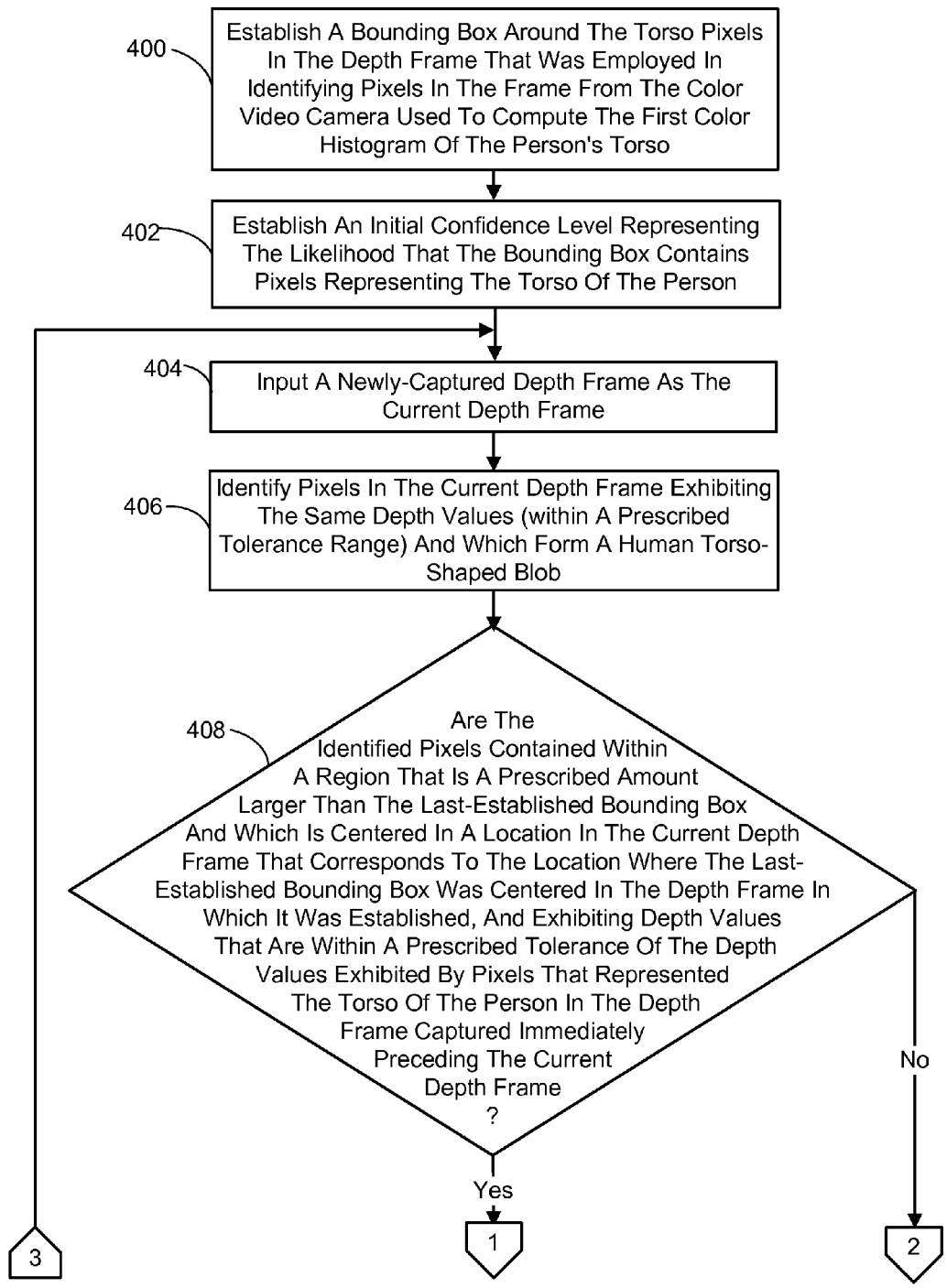
FIGS. 4A-C are a flow diagram generally outlining an implementation of the part of the process of FIG. 3 involving tracking the location of a person as that person moves through the environment.
Figure 4B:
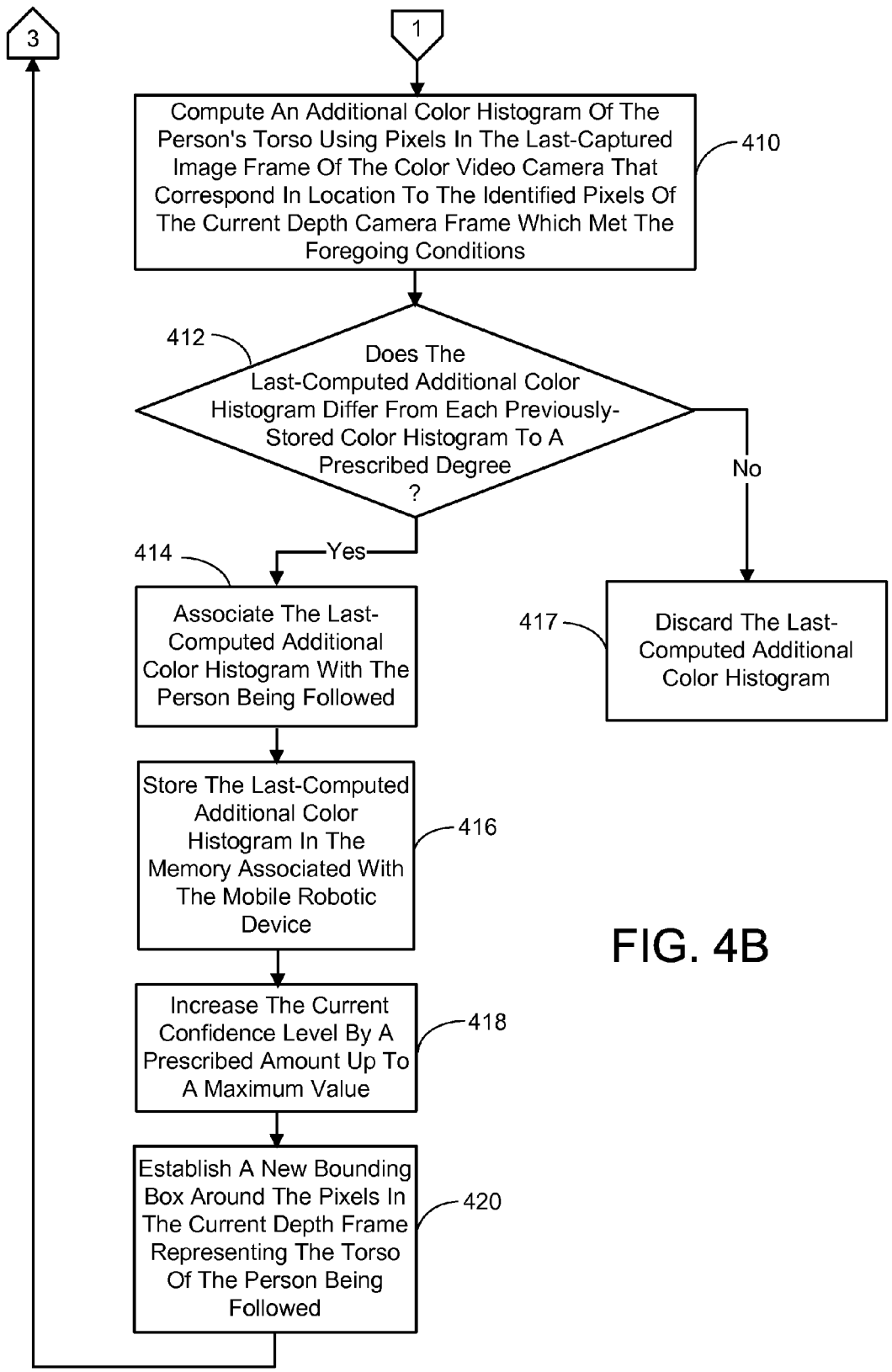
Figure 4C:
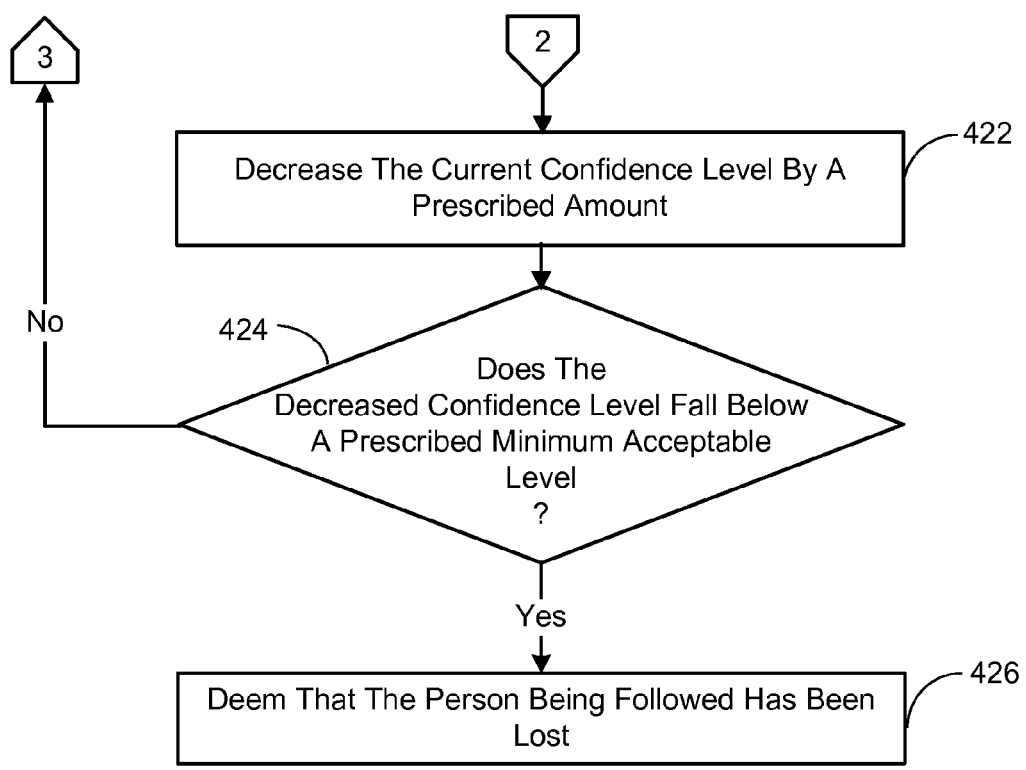

Referring now to FIGS. 4A-C, in one embodiment the aforementioned process action of tracking the location of the person as the person moves through the environment, includes first establishing a bounding box around the torso pixels in the depth frame that was employed in identifying pixels in the frame from the color video camera used to compute the first color histogram of the person's torso (process action 400). An initial confidence level representing the likelihood that the bounding box contains pixels representing the torso of the person is then established (process action 402). For example, in one implementation this initial value was set to 0.7. Next, a newly-captured depth frame is input as the current depth frame (process action 404), and pixels in the current depth frame exhibiting the same depth values (within a prescribed tolerance range) and which form a human torso-shaped blob, are identified (process action 406). It is then determined if the identified pixels meet conditions that include: being contained within a region that is a prescribed amount larger than the last-established bounding box and which is centered in a location in the current depth frame that corresponds to the location where the last-established bounding box was centered in the depth frame in which it was established; and exhibiting depth values that are within a prescribed tolerance of the depth values exhibited by pixels that represented the torso of the person in the depth frame captured immediately preceding the current depth frame (process action 408).

Whenever the identified pixels meet the foregoing conditions, first an additional color histogram of the person's torso is computed using pixels in the last-captured image frame of the color video camera that correspond in location to the identified pixels of the current depth camera frame which met the conditions (process action 410). It is then determined if this last-computed additional color histogram differs from each previously-stored color histogram to a prescribed degree (process action 412). If so, the last-computed additional color histogram is associated with the person (process action 414) and stored in the memory associated with the mobile robotic device (process action 416). If not, the last-computed additional color histogram is discarded (417). In addition, when the last-computed additional color histogram differs from each previously-stored color histogram to a prescribed degree, in process action 418, the current confidence level is increased by a prescribed amount (e.g., 0.1) up to a maximum value (e.g., 1.0); and in process action 420, a new bounding box is established around the pixels in the current depth frame representing the torso of the person. Process actions 404 through 420 are then repeated, as appropriate.

However, if in process action 408 it is determined that the identified pixels do not meet the aforementioned conditions, then in process action 422, the current confidence level is decreased by a prescribed amount (e.g., 0.1). In addition, it is determined if the decreased confidence level falls below a prescribed minimum acceptable confidence level (process action 424). If not, then process actions 404 through 424 are repeated as appropriate.

Thus, in the foregoing bounding box-based tracking procedure, if the torso of the person being followed is not found in this bounding box (for whatever reason, e.g., the person went out of robotic device's view or some other person came in-between the robotic device and the person being tracked), the confidence level of the blob is decreased. However, if the torso blob is found again in the expected region within a short interval (i.e., before the confidence level falls below the prescribed minimum acceptable level), the confidence level is increased. Since each blob is uniquely identified by its bounding box, even if another person comes in between the person being tracked and the mobile robotic device, it can be determined that this blob is outside the bounding box (because two persons cannot occupy the same physical space and so the depth values will not be that of the expected region), and the interrupting person will not be tracked.

If, however, in process action 424, it is determined the decreased confidence level falls below the prescribed minimum acceptable confidence level, then it is deemed that the person being followed has been lost (process action 426). Generally, in one embodiment, as soon as the person being followed is lost, the mobile robotic device suspends the following mode, and attempts to reacquire the person.

The color histograms that were computed, associated with the person being followed, and stored, are generally used in attempts to reacquire the lost person. As will be described shortly, the color histograms can be used alone or in conjunction with face detection. In this way, the person can be reacquired even if their face or head is not visible. It is noted that the foregoing procedure can also result in multiple color histograms associated with the person being stored. Each of these histograms is unique in that each is different from the other stored histograms by a prescribed degree. Continuously adding the unique color histograms is done to improve the chances that the person can be reacquired despite changing conditions. For example, if the person changes the coat while being followed, it would be possible to reacquire the person both with and without the coat. The same is true for differing lighting conditions and capturing color histograms of the person from various points of view.

Figure 5:
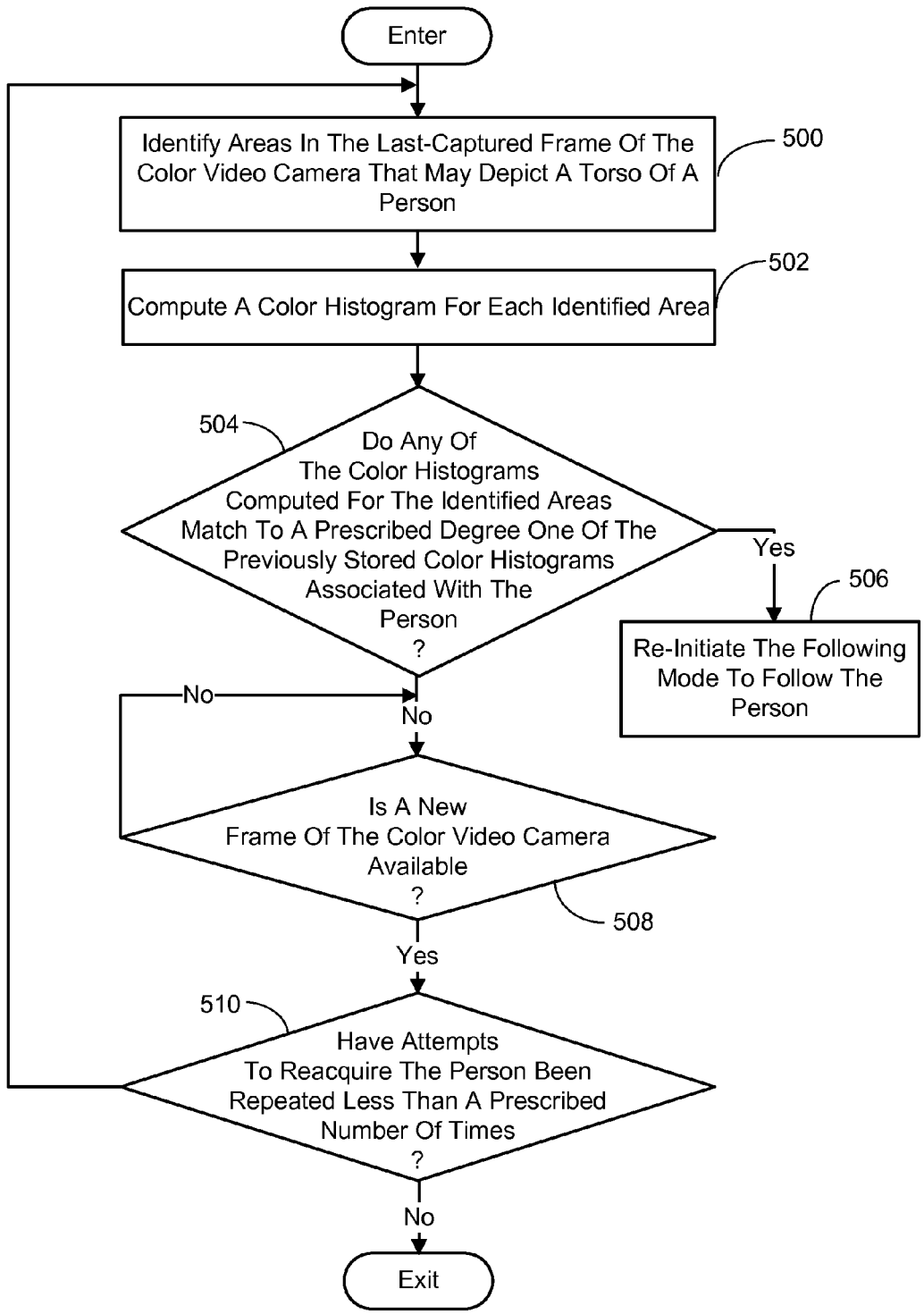
FIG. 5 is a flow diagram generally outlining a process for reacquiring a person that was being followed, but was lost.

In one implementation outlined in FIG. 5, the aforementioned attempt to reacquire the person includes first identifying areas in the last-captured frame of the color video camera that may depict a torso of a person (process action 500). This can be accomplished by first fusing the face detected in color domain with the head blob detected in the depth domain. The torso of a person will appear as a rectangular region in depth domain below the head. The corresponding rectangular region from the color domain where the depth values lie within a threshold depth (e.g., 50 cm) is cut and used as the torso of the person for color histogram computation purposes. A color histogram is then computed for each identified area (process action 502), and then it is determined if any of the color histograms computed for the identified areas matches to a prescribed degree one of the previously stored color histograms associated with the person (process action 504). If such a color histogram is found, it is deemed the person has been located (i.e., reacquired) and the following mode is re-initiated to follow the person (process action 506). However, when no such color histogram of an area in found, it is determined if a new frame of the color video camera is available (process action 508). If not, process action 508 is repeated until one becomes available. When a new frame of the color video camera is available, it is determined in process action 510 if an attempt to reacquire the person has been repeated less than a prescribed number of times (for example 30 times, which would correspond to 2 seconds assuming 15 frames per second). If less, then process actions 500 through 510 are repeated as appropriate. However, if it is determined that the number of attempts to reacquire the person is not less than the prescribed number, then the process ends. At that point, in one embodiment, the mobile robotic device returns to the previously described tracking mode.

Figure 6:
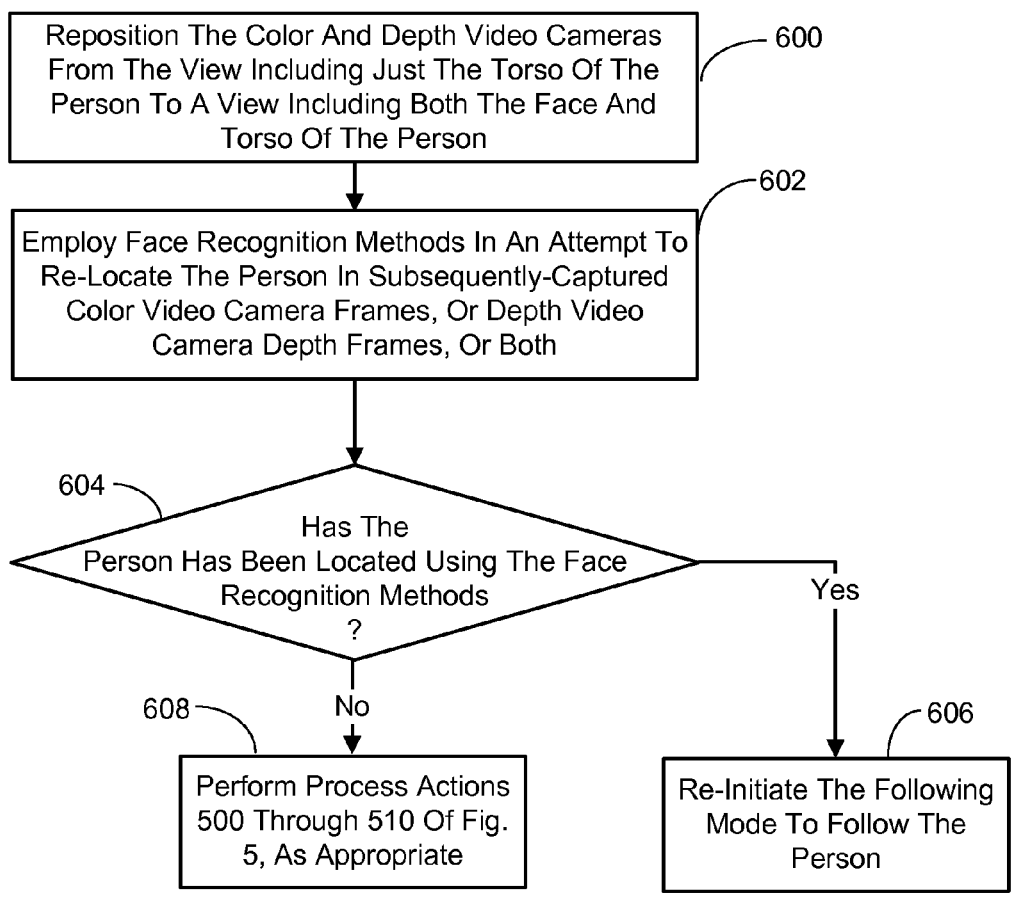
FIG. 6 is a flow diagram generally outlining a process for reacquiring a person that was being followed, but was lost, which includes employing face detection methods.

As indicated previously, the aforementioned attempt to reacquire the person can also include employing face detection methods. In one embodiment this is accomplished as outlined in FIG. 6. First, the color and depth video cameras are repositioned from the view including just the torso of the person to a view including both the face and torso of the person (process action 600). Face recognition methods are then employed in an attempt to re-locate the person in subsequently-captured color video camera frames, or depth video camera depth frames, or both (process action 602). It is next determined if the person has been located (i.e., reacquired) using the face recognition methods (process action 604). If so, the following mode is re-initiated to follow the person (process action 606). If not, then the reacquisition process described previously in conjunction with FIG. 5 is performed (process action 608).

With regard to the previously described process actions involving the determination of whether a color histogram matches another to a prescribed degree or not, a correlation-based procedure that quantitatively compares two color histograms can be employed. In one embodiment, this correlation-based procedure involves calculating a dominant color histogram. More particularly, an initial pass is carried out where for each color pixel in the color frame, the Red values are compared to the Blue and Green values, and the Red values are set to zero if they are less than either the Blue or Green values of the corresponding pixel by more than a prescribed threshold difference (e.g., 30). Similarly, Green is compared to the corresponding Red and Blue pixels and its value is set to zero if it is less than the Red or Blue pixels more than the prescribed threshold difference. Likewise, Blue is compared to the corresponding Red and Green pixels and its values is set to zero if it is less than Red or Green pixels more than the prescribed threshold difference. This procedure ensures that if there is a dominant color, it has a larger effect on the correlation since the other less significant colors are zeroed out. Next, a histogram is calculated for the modified color frame by binning the colors into ranges and calculating the number of pixels which fall within each range. To compare two dominant color histograms, cross correlation is computed between the histograms and if the cross correlation coefficient is greater than a threshold value (e.g., 0.6) then the two color histogram are deemed to match to the aforementioned prescribed degree and if the cross correlation coefficient is not greater than the threshold value then the two color histogram are deemed to differ by the aforementioned prescribed degree. Other methods of comparing color histograms (such as the sum of absolute differences method) can also be used to augment the cross correlation matching.

Figure 7:
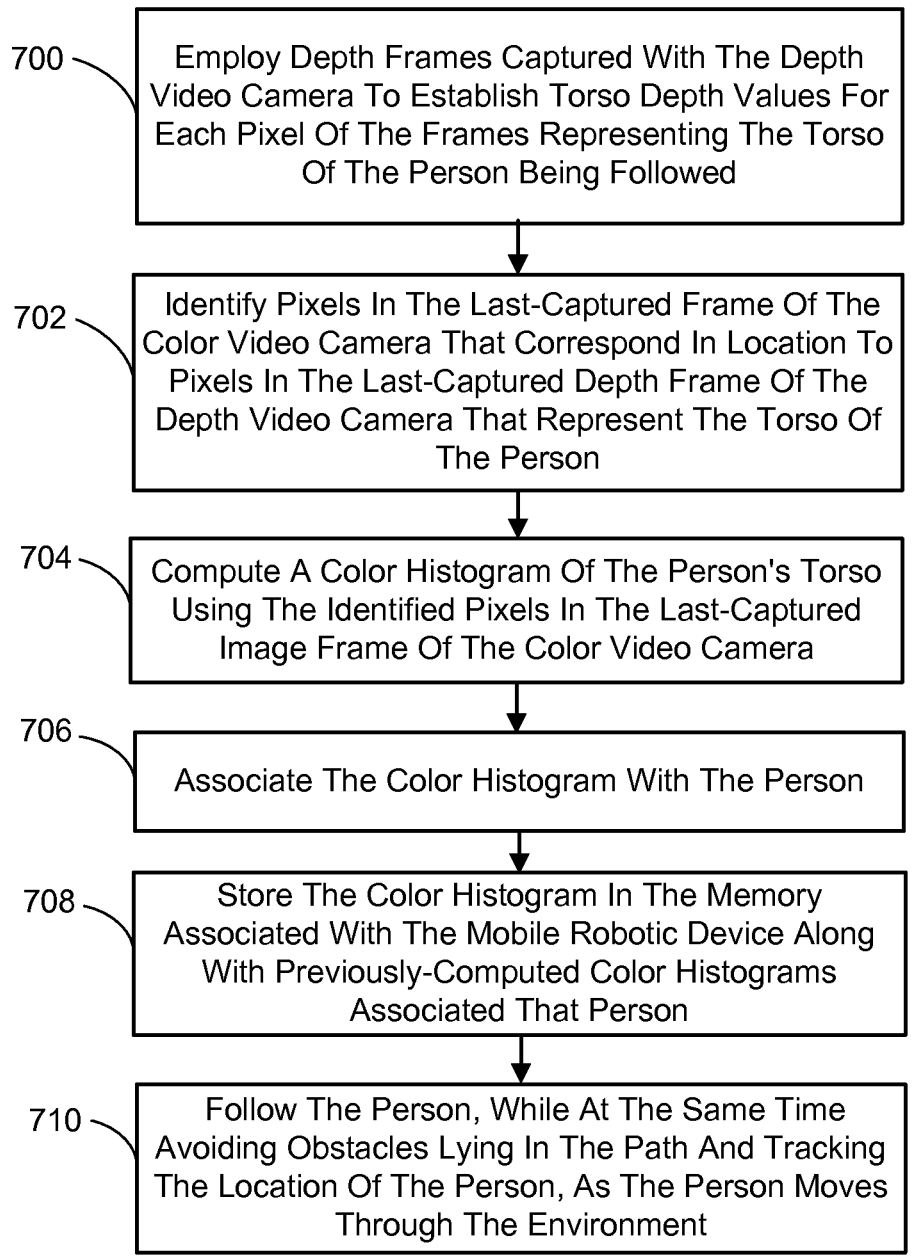
FIG. 7 is a flow diagram generally outlining an implementation of the part of the process of FIG. 5 or FIG. 6 involving re-initiating the following mode.

With regard to re-initiating the following mode, in one embodiment this is accomplished as outlined in FIG. 7. More particularly, depth frames captured with the depth video camera are employed to establish torso depth values for each pixel of the frames representing the torso of the person being followed (process action 700). Pixels are then identified in the last-captured frame of the color video camera that correspond in location to pixels in the last-captured depth frame of the depth video camera that represent the torso of the person (process action 702). A color histogram of the person's torso is then computed using the identified pixels in the last-captured image frame of the color video camera (process action 704). The color histogram is associated with the person (process action 706), and stored in the memory associated with the mobile robotic device along with previously-computed color histograms associated that person (process action 708). Whenever the person changes location, the mobile robotic device follows the person, while at the same time avoiding obstacles lying in the path and tracking the location of the person as the person moves through the environment (process action 710).

It is noted that in addition to the following mode being terminated when a person being followed is lost and cannot be reacquired as described previously, the following mode can be terminated by the request of the person being followed. In this latter case, the person being followed would interact with the mobile robotic device via conventional methods and request that the robotic device stop following. The mobile robotic device would then terminate the following mode; and as indicated previously, in one embodiment, return to the previously described tracking mode.

2.0 Exemplary Operating Environments

Figure 8:
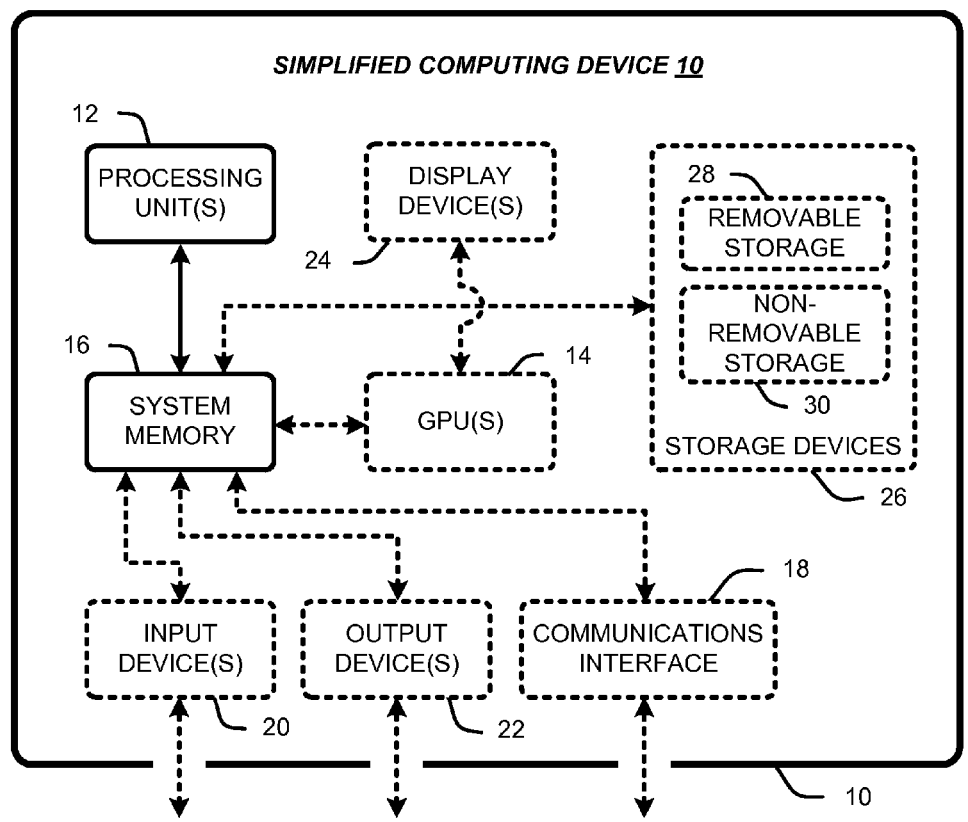
FIG. 8 is a diagram depicting a general purpose computing device constituting an exemplary system for implementing tracking and following technique embodiments described herein.

The tracking and following technique embodiments described herein are operational within numerous types of general purpose or special purpose computing system environments or configurations. FIG. 8 illustrates a simplified example of a general-purpose computer system on which various embodiments and elements of the tracking and following technique embodiments, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the tracking and following technique embodiments described herein, the device should have a sufficient computational capability and system memory to enable basic computational operations. In particular, as illustrated by FIG. 8, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 18. The simplified computing device of FIG. 8 may also include one or more conventional computer input devices 20 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 8 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various tracking and following technique embodiments described herein, or portions thereof, may be stored, received, transmitted, or read from any desired combination of computer or machine readable media or storage devices and communication media in the form of computer executable instructions or other data structures.

Finally, the tracking and following technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

Figure 9:
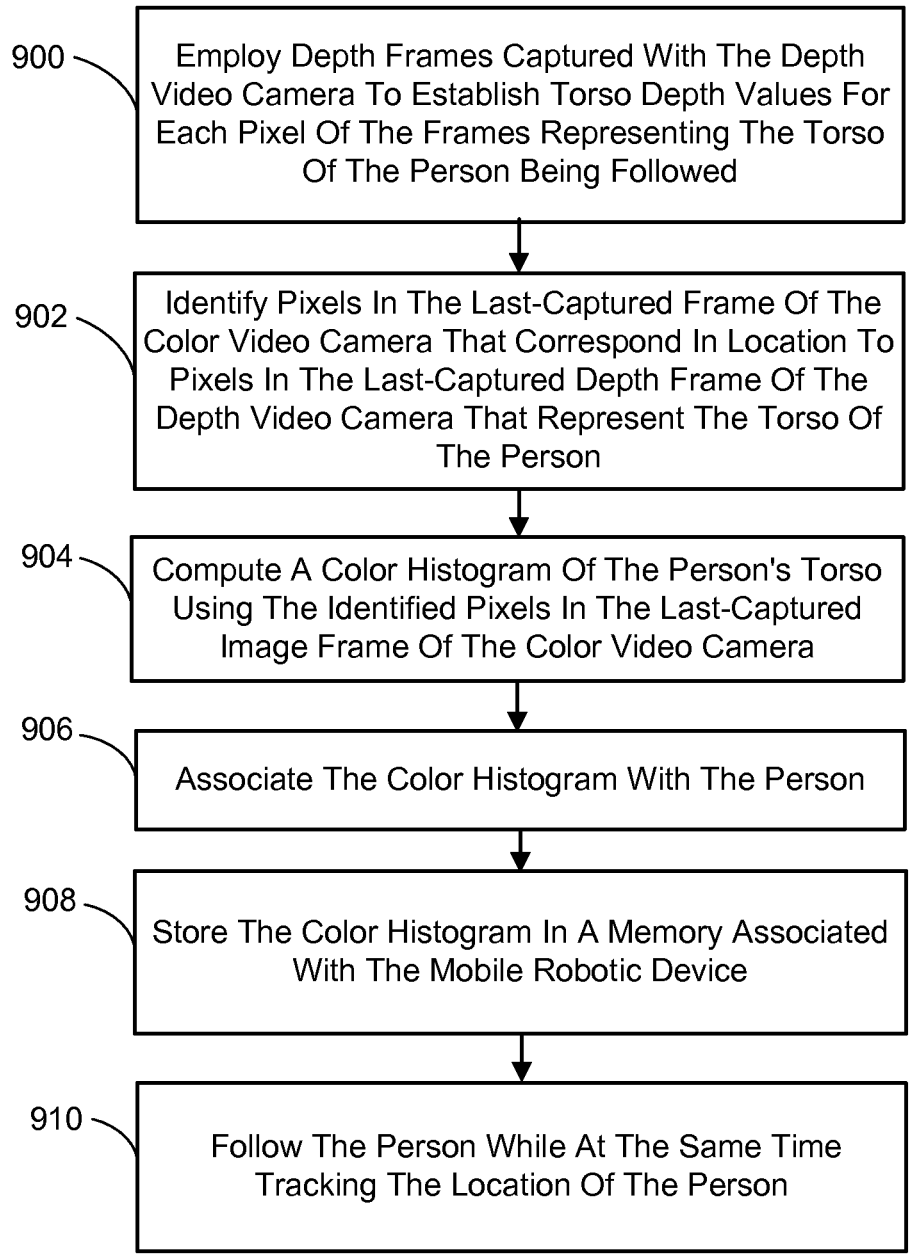
FIG. 9 is a flow diagram generally outlining a simplified implementation of the part of the process of FIG. 1 involving the following mode.

It is noted that in the foregoing descriptions of the tracking and following technique embodiments, it was assumed that the obstacle avoidance system of the mobile robotic device required the use of the color and depth video cameras. However, this need not be the case. Rather the obstacle avoidance system could employ other sensors and conventional methods independent of the color and depth video cameras described previously. In this alternate scenario, there would be no need to reposition these cameras to capture a view of the robotic device's path through the environment. As such the following mode could be simplified by eliminating the repositioning actions. More particularly, referring to FIG. 9, in one embodiment, the simplified following mode begins with employing depth frames captured with the depth video camera to establish torso depth values for each pixel of the frames representing the torso of the person being followed (process action 900). Pixels are then identified in the last-captured frame of the color video camera that correspond in location to pixels in the last-captured depth frame of the depth video camera that represent the torso of the person (process action 902). A color histogram of the person's torso is then computed using the identified pixels in the last-captured image frame of the color video camera (process action 904). The color histogram is associated with the person (process action 906), and stored in a memory associated with the mobile robotic device (process action 908). Whenever the person changes location, the mobile robotic device follows the person, while at the same time tracking the location of the person as the person moves through the environment (process action 910). It is noted that in the foregoing embodiment, the cameras can capture both torso and head of the person. In addition, if the head is imaged and the face is visible, the face information can also be used to augment the color information to track the person.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for tracking and following a person using a mobile robotic device having a color video camera and a depth video camera, comprising:
using a computer associated with the mobile robotic device to perform the following process actions:
in a tracking mode,
using a face detection method and the output from the color video camera to detect the locations of one or more persons potentially in an environment,
using a motion detection method and the output from the depth video camera to detect the locations of one or more persons potentially in the environment,
fusing detection results obtained using the face and motion detection methods, said fusing comprising, for each person potentially in the environment whose location was detected using the face detection method, ascertaining if the location of the person corresponds to the location of a person potentially in the environment detected using the motion detection method, and deeming that location to be the location of one person in the environment, and
using the fused detection results to establish the locations of one or more persons in the environment; and
in a following mode, employing a mobile robotic device following method to follow a person whose location was established in the tracking mode.

2. The process of claim 1, further comprising an action in the tracking mode of tracking the location of each person in the environment over time.

3. The process of claim 2, wherein the action of tracking the location of each person in the environment over time, comprises periodically repeating the actions of,
using the face detection method and the output from the color video camera to detect potential persons in an environment,
using the motion detection method and the output from the depth video camera to detect potential persons in the environment,
fusing detection results obtained using the face and motion detection methods, and
using the fused detection results to determine the location of one or more persons in the environment.

4. The process of claim 1, further comprising an action in the tracking mode of attempting to ascertain the identity of one or more persons in the environment.

5. The process of claim 1, wherein the following mode action of employing the mobile robotic device following method to follow said person, comprises an action of initiating the following mode in response to a request from one of the persons detected in the environment to follow that person.

6. The process of claim 1, wherein the following mode action of employing the mobile robotic device following method to follow said person, comprises an actions of:
repositioning said color and depth video cameras, from a view comprising the face of the person, to a view comprising the torso of the person and the path ahead of the mobile robotic device such that obstacles lying in the path of the mobile robotic device encountered while following the person are in the view of the color and depth video cameras;
employing depth frames captured with the depth video camera during said repositioning to establish torso depth values for each pixel of the frames representing the torso of the person;
once the repositioning of the color and depth video cameras is complete,
identifying pixels in the last-captured image frame of the color video camera that correspond in location within the scene depicted to pixels in the last-captured depth frame of the depth video camera which represent the torso of the person, and computing a first color histogram of the person's torso using the identified pixels in the last-captured image frame of the color video camera, associating the color histogram with the person, and storing the color histogram in a memory associated with the mobile robotic device; and whenever the person changes location, using said mobile robotic device following method to follow the person, while at the same time avoiding obstacles lying in the path taken to follow the person and tracking the location of the person as the person moves.

7. The process of claim 6, wherein the process action of using said mobile robotic device following method to follow the person, comprises an action of taking a path to follow the person that maintains the ability to track the location of the person despite obstacles that have the potential to block a line of sight between the mobile robotic device and the person.

8. The process of claim 6, wherein the process action of tracking the location of the person as the person moves, comprises the actions of:
  (a) establishing a bounding box around the pixels in the depth frame from the depth video camera representing the torso of the person that was employed in identifying pixels in the frame from the color video camera used to compute the first color histogram of the person's torso;
  (b) establishing an initial confidence level representing the likelihood that the bounding box contains pixels representing the torso of the person;
  (c) inputting a newly-captured depth frame as the current depth frame;
  (d) identifying pixels in the current depth frame exhibiting the same depth values within a prescribed tolerance range and which form a human torso-shaped blob;
  (e) determining if the identified pixels meet conditions comprising,
    being contained with a region that is a prescribed amount larger than the last-established bounding box and which is centered in a location in the current depth frame that corresponds to the location where the last-established bounding box was centered in the depth frame it was established in, and
    exhibiting depth values that are within a prescribed tolerance of the depth values exhibited by pixels in the depth frame captured immediately preceding the current depth frame that represented the torso of the person;
  (f) whenever the identified pixels meet the conditions,
    computing an additional color histogram of the person's torso using pixels in the last-captured image frame of the color video camera that correspond in location within the scene to the identified pixels of the current depth camera frame which met said conditions,
    determining if the last-computed additional color histogram differs from each previously-stored color histogram to a prescribed degree, and if so associating the last-computed additional color histogram with the person and storing the last-computed additional color histogram in said memory associated with the mobile robotic device,
    increasing the current confidence level by a prescribed amount up to a maximum value, and
    establishing a new bounding box around the pixels in the current depth frame representing the torso of the person, and
    repeating actions (c) through (f), as appropriate;
  (g) whenever the identified pixels do not meet the conditions,
    decreasing the current confidence level by a prescribed amount,
    determining if the decreased confidence level falls below a prescribed minimum acceptable confidence level,
    whenever the decreased confidence level does not fall below the prescribed minimum acceptable confidence level, repeating actions (c) through (g), as appropriate.

9. The process of claim 8, wherein whenever it is determined the decreased confidence level does fall below the prescribed minimum acceptable confidence level, performing the action of:
  suspending the following mode; and
  attempting to reacquire the person.

10. The process of claim 9, wherein the process action of attempting to reacquire the person, comprises the actions of:
  attempting to find an area in the last-captured image frame of the color video camera that a color histogram computed for the area matches to a prescribed degree one of the previously stored color histograms associated with the person;
  whenever a color histogram of an area in the last-captured image frame of the color video camera matches to the prescribed degree one of the previously stored color histograms associated with the person, re-initiating the following mode to follow the person; and
  whenever no area in the last-captured image frame of the color video camera has a color histogram that matches to the prescribed degree one of the previously stored color histograms associated with the person, repeating the attempt to find an area in up to a prescribed number of subsequently-captured image frames of the color video camera that has a color histogram computed for the area which matches to a prescribed degree one of the previously stored color histograms associated with the person, and if an area has a color histogram that matches to a prescribed degree one of the previously stored color histograms associated with the person is found in a subsequently-captured image frames of the color video camera, re-initiating the following mode to follow the person.

11. The process of claim 10, wherein the process actions for re-initiating the following mode to follow the person, comprises the actions of:
  employing depth frames captured with the depth video camera to establish torso depth values for each pixel of the frames representing the torso of the person;
  identifying pixels in the last-captured image frame of the color video camera that correspond in location within the scene depicted to pixels in the last-captured depth frame of the depth video camera, which represent the torso of the person;
  computing a color histogram of the person's torso using the identified pixels in the last-captured image frame of the color video camera;
  associating the color histogram with the person, and
  storing the color histogram in said memory associated with the mobile robotic device; and
  whenever the person changes location, using said mobile robotic device following method to follow the person, while at the same time avoiding obstacles lying in the path taken to follow the person and tracking the location of the person as the person moves.

12. The process of claim 9, wherein the process action of attempting to reacquire the person, comprises the actions of:

repositioning said color and depth video cameras from said view comprising the torso of the person to a view comprising the face and torso of the person;

employing face recognition methods to re-locate the person in subsequently-captured color video camera image frames, or depth video camera depth frames, or both; and whenever the person is re-located, re-initiating the following mode to follow the person.

13. The process of claim 12, wherein in addition to employing face recognition methods to re-locate the person, employing actions to relocate the person comprising:

attempting to find an area in the last-captured image frame of the color video camera that a color histogram computed for the area matches to a prescribed degree one of the previously stored color histograms associated with the person;

whenever a color histogram of an area in the last-captured image frame of the color video camera matches to the prescribed degree one of the previously stored color histograms associated with the person, deeming the person to be located in that area; and whenever no color histogram of an area in the last-captured image frame of the color video camera matches to the prescribed degree one of the previously stored color histograms associated with the person, repeating the attempt to find an area in up to a prescribed number of subsequently-captured image frames of the color video camera that a color histogram computed for the area matches to a prescribed degree one of the previously stored color histograms associated with the person, and if a color histogram of an area that matches to a prescribed degree one of the previously stored color histograms associated with the person is found in a subsequently-captured image frames of the color video camera, deeming the person to be located in that area.

14. The process of claim 12, wherein the process actions for re-initiating the following mode to follow the person, comprises the actions of:

repositioning said color and depth video cameras, from a view comprising the face and torso of the person, to a view comprising the torso but not the face of the person and the path ahead of the mobile robotic device such that obstacles lying in the path of the mobile robotic device encountered while following the person are in the view of the color and depth video cameras;

employing depth frames captured with the depth video camera during said repositioning to establish torso depth values for each pixel of the frames representing the torso of the person;

once the repositioning of the color and depth video cameras is complete, identifying pixels in the last-captured image frame of the color video camera that correspond in location within the scene depicted to pixels in the last-captured depth frame of the depth video camera, which represent the torso of the person, and computing a color histogram of the person's torso using the identified pixels in the last-captured image frame of the color video camera, associating the color histogram with the person, and storing the color histogram in said memory associated with the mobile robotic device; and whenever the person changes location, using said mobile robotic device following method to follow the person, while at the same time avoiding obstacles lying in the path taken to follow the person and tracking the location of the person as the person moves.

15. A computer-implemented process for tracking and following a person using a mobile robotic device having a color video camera and a depth video camera, comprising:

using a computer associated with the mobile robotic device to perform the following process actions:

in a tracking mode, using a face detection method and the output from the color video camera to detect the locations of one or more persons potentially in a environment, using a motion detection method and the output from the depth video camera to detect the locations of one or more persons potentially in the environment, fusing detection results obtained using the face and motion detection methods, said fusing comprising, for each person potentially in the environment whose location was detected using the face detection method, ascertaining if the location of the person corresponds to the location of a person potentially in the environment detected using the motion detection method, and deeming that location to be the location of one person in the environment, and using the fused detection results to establish the locations of one or more persons in the environment; and in a following mode, for a person whose location was established, employing depth frames captured with the depth video camera to establish depth values for each pixel of the frames representing the person;

identifying pixels in the last-captured image frame of the color video camera that correspond in location within the scene depicted to pixels in the last-captured depth frame of the depth video camera, which represent the person, computing a first color histogram of the person's torso using the identified pixels in the last-captured image frame of the color video camera, associating the color histogram with the person, and storing the color histogram in a memory associated with the mobile robotic device; and whenever the person changes location, using said mobile robotic device to follow the person, while at the same time tracking the location of the person as the person moves.

16. The process of claim 15, wherein the process action of tracking the location of the person as the person moves, comprises the actions of:

(a) establishing a bounding box around the pixels in the depth frame from the depth video camera representing the person that was employed in identifying pixels in the frame from the color video camera used to compute the first color histogram of the person;

(b) establishing an initial confidence level representing the likelihood that the bounding box contains pixels representing the person;

(c) inputting a newly-captured depth frame as the current depth frame;

(d) identifying pixels in the current depth frame exhibiting the same depth values within a prescribed tolerance range and which form a human-shaped blob;

(e) determining if the identified pixels meet conditions comprising, being contained with a region that is a prescribed amount larger than the last-established bounding box and which is centered in a location in the current depth frame that corresponds to the location where the last-established bounding box was centered in the depth frame it was established in, and exhibiting depth values that are within a prescribed tolerance of the depth values exhibited by pixels in the depth frame captured immediately preceding the current depth frame that represented the person;

(f) whenever the identified pixels meet the conditions, computing an additional color histogram of the person's torso using pixels in the last-captured image frame of the color video camera that correspond in location within the scene to the identified pixels of the current depth camera frame which met said conditions, determining if the last-computed additional color histogram differs from each previously-stored color histogram to a prescribed degree, and if so associating the last-computed additional color histogram with the person and storing the last-computed additional color histogram in said memory associated with the mobile robotic device, increasing the current confidence level by a prescribed amount up to a maximum value, and establishing a new bounding box around the pixels in the current depth frame representing the torso of the person, and repeating actions (c) through (f), as appropriate;

(g) whenever the identified pixels do not meet the conditions, decreasing the current confidence level by a prescribed amount, determining if the decreased confidence level falls below a prescribed minimum acceptable confidence level, whenever the decreased confidence level does not fall below the prescribed minimum acceptable confidence level, repeating actions (c) through (g), as appropriate.

17. The process of claim 16, wherein whenever it is determined the decreased confidence level does fall below the prescribed minimum acceptable confidence level, performing the action of:

suspending the following mode; and attempting to find an area in the last-captured image frame of the color video camera that a color histogram computed for the area matches to a prescribed degree one of the previously stored color histograms associated with the person;

whenever a color histogram computed for an area in the last-captured image frame of the color video camera matches to the prescribed degree one of the previously stored color histograms associated with the person, re-initiating the following mode to follow the person; and whenever no color histogram computed for an area in the last-captured image frame of the color video camera matches to the prescribed degree one of the previously stored color histograms associated with the person, repeating the attempt to find an area in up to a prescribed number of subsequently-captured image frames of the color video camera that a color histogram computed for the area matches to a prescribed degree one of the previously stored color histograms associated with the person, and if a color histogram computed for an area that matches to a prescribed degree one of the previously stored color histograms associated with the person is found in a subsequently-captured image frames of the color video camera, re-initiating the following mode to follow the person.

18. The process of claim 17, wherein each color histogram computed is computed as a dominant color histogram, and wherein the process actions of determining if the last-computed additional color histogram differs from each previously-stored color histogram to a prescribed degree and attempting to find an area in the last-captured image frame of the color video camera that a color histogram computed for the area matches to a prescribed degree one of the previously stored color histograms associated with the person, each comprises the actions of:

for each pair of dominant color histograms compared, computing a cross correlation between the histograms, determining if the resulting cross correlation coefficient is greater than a prescribed threshold value, whenever it is determined the cross correlation coefficient is not greater than a prescribed threshold value, deeming that the color histograms differ from each other to a prescribed degree, and whenever it is determined the cross correlation coefficient is greater than a prescribed threshold value, deeming that the color histograms match each other to a prescribed degree.

19. A mobile robotic device for tracking and following a person, comprising:

a head section comprising a repositionable color video camera and a repositionable depth video camera;

a locomotive section that is disposed below the head section, said locomotive section being used to move the mobile robotic device through an environment; and a control unit for controlling the head and locomotive sections, and the repositionable color and depth video cameras, said control module comprising, a computing device, and a computer program comprising program modules executable by the computing device, wherein the computing device is directed by the program modules of the computer program to, via a tracking mode sub-module, employ a face detection method and at least the output from the color video camera to detect the locations of one or more persons potentially in an environment, employ a motion detection method and at least the output from the depth video camera to detect the locations of one or more persons potentially in the environment, fuse detection results obtained using the face and motion detection methods, said fusing comprises, for each person potentially in the environment whose location was detected using the face detection method, ascertaining if the location of the person corresponds to the location of a person potentially in the environment detected using the motion detection method, and deeming that location to be the location of one person in the environment, and employ the fused detection results to establish the locations of one or more persons in the environment, and via a following mode sub-module, employ a mobile robotic device following method to follow a person whose location was established in the tracking mode.

* * * * *